April 25, 1961   J. W. McAULEY ET AL   2,981,268
VIBRATORY TREATING APPARATUS
Filed May 17, 1957   3 Sheets-Sheet 3
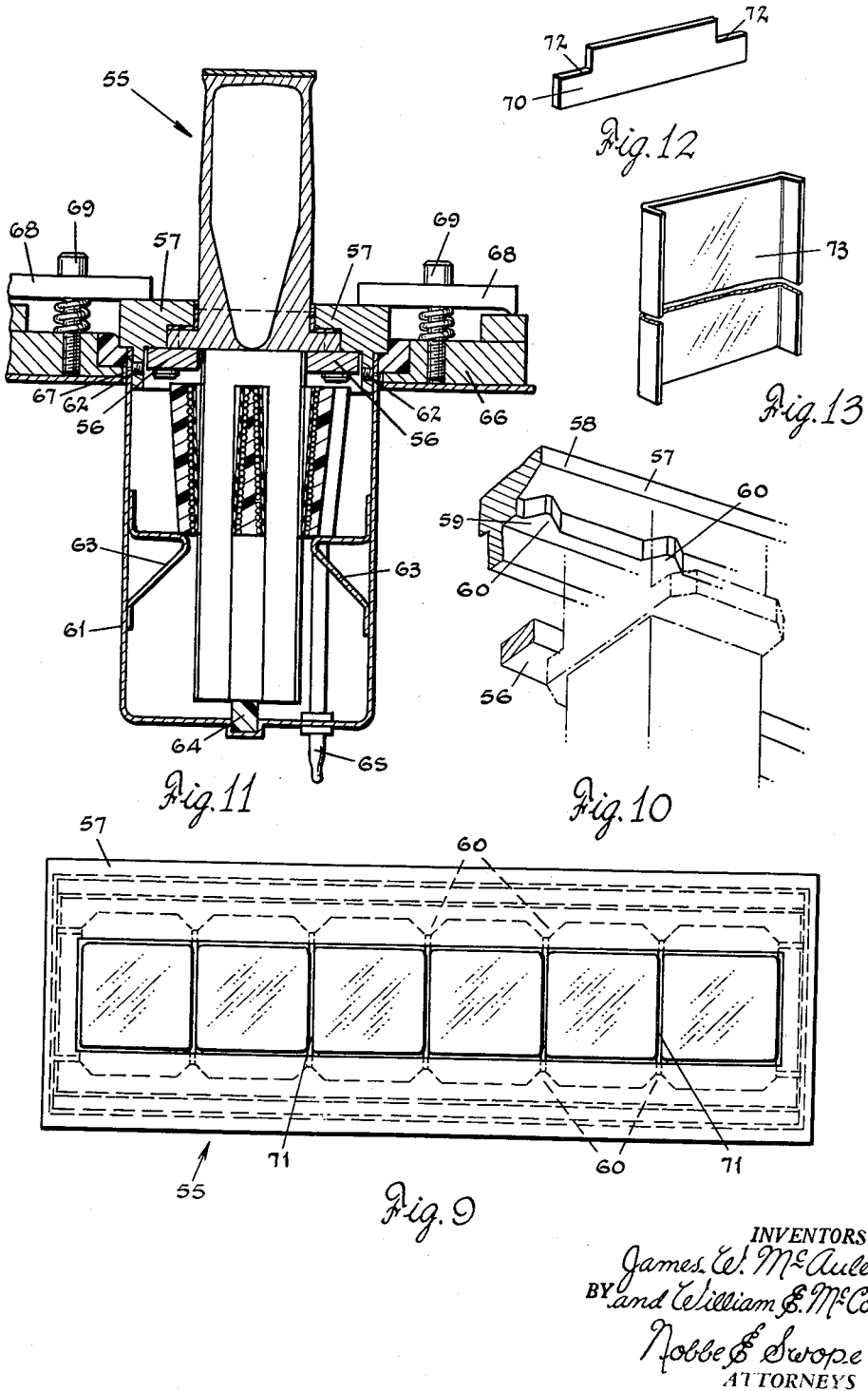

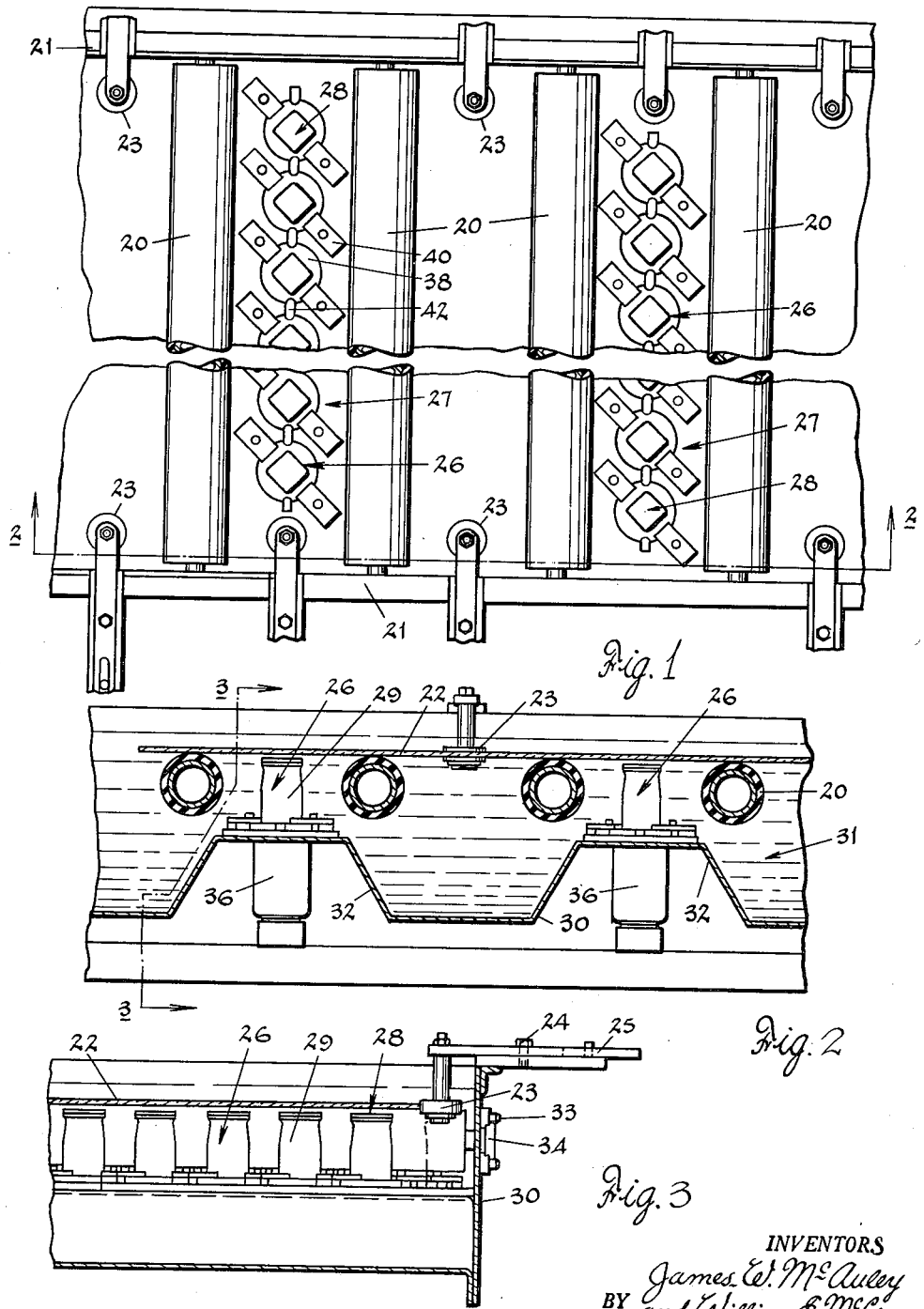

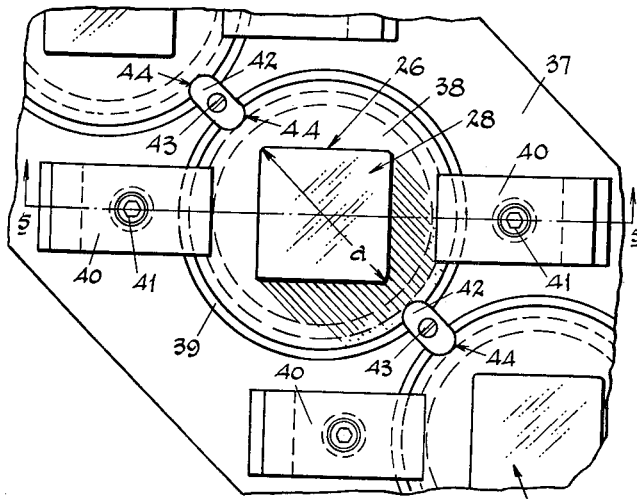

United States Patent Office

2,981,268
Patented Apr. 25, 1961

2,981,268

VIBRATORY TREATING APPARATUS

James W. McAuley and William E. McCown, Toledo, Ohio, assignors to Libbey-Owens-Ford Glass Company, Toledo, Ohio, a corporation of Ohio Filed May 17, 1957, Ser. No. 659,934

9 Claims. (Cl. 134—122)

The present invention relates broadly to sonic vibration generating apparatus, and in particular to an improved form of surface treating apparatus that employs sonic vibrations.

Although the invention is not restricted to the treating of any particular surface, whether of glass or any other material, it is especially well adapted to carry out the difficult job of cleaning glass sheets, particularly plate glass sheets which have been bedded in plaster of Paris during a prior grinding and polishing operation or sheets which are covered with a layer of polishing rouge. Heretofore, the removal of this plaster and rouge, and other foreign matter from the surface of glass sheets was difficult to achieve.

Now, however, by means of the present invention even this difficult and unusual cleaning operation can be carried out without the deficiencies and objectionable features of previous cleaning methods, by the use of sonic vibrations, preferably in the frequency range between 100 and 30,000 cycles per second which are transmitted in the form of vibration sound waves through a suitable medium in contact with the surface to be cleaned. As these sound waves are propagated through the medium, which for our purpose is a liquid, motion of the particles of the liquid will produce an alternate formation and collapse of gas bubbles, which phenomenon is referred to as cavitation. The collapse of the bubbles creates an agitation of sufficient magnitude within the medium to disintegrate particles of substantially solid materials which are in contact with the medium.

In its more specific aspects, the present invention employs the phenomenon just described to wash the underside of a glass sheet by passing the sheet through a bath of a suitable liquid medium which is being vibrated by sonic energy generating elements. These generating elements which may be magnetostrictive transducers are preferably arranged so as to direct the generated energy onto the glass sheets being moved thereover along a path substantially normal to the surface thereof.

Heretofore, it has been difficult to clean the underside of a glass sheet by sonic method without turning the sheets over. This turning of relatively large glass sheets is not only a difficult and time consuming job, but also one in which the risk of chipping, scratching, and breaking of the sheets is very great.

It is therefore an object of this invention to provide a novel apparatus for thoroughly cleaning the lower surface of sheet material in a continuous manner, and one that is particularly suited for use in a factory production line.

Another object of the invention is the provision of an improved apparatus with which the underside of sheet materials can be cleaned by means of sonic vibrations.

Still another object of the invention is the provision of a unique mounting bar for maintaining a plurality of vibration generating elements in a fixed relation with respect to one another.

Another object is the provision of a power factor correcting means and the vibration generating means as a unitary structure.

In the drawings wherein like numerals are employed to designate like parts throughout the same:

Fig. 1 is a fragmentary plan view of a cleaning section of a production line, showing cleaning appartus constructed in accordance with the invention incorporated herein:

Fig. 2 is a longitudinal section taken substantially along line 2—2 of Fig. 1;

Fig. 3 is a fragmentary vertical sectional view taken along 3—3 of Fig. 2;

Fig. 4 is a fragmentary plan view of a transducer in position in the cleaning apparatus according to a preferred embodiment of the invention;

Fig. 5 is a vertical sectional view through a transducer housing and mounting taken along line 5—5 of Fig. 4;

Fig. 6 is a cross-sectional view of a transducer core and coil taken along 6—6 of Fig. 5;

Fig. 7 is a cross-sectional view through a transducer core and magnet taken along line 7—7 of Fig. 5;

Fig. 8 is a vertical cross-sectional view taken along line 8—8 of Fig. 6;

Fig. 9 is a longitudinal plan view partially in section of a modified form of the invention;

Fig. 10 is a perspective view of a clamping bar for use in the modified form of the invention;

Fig. 11 is a sectional view of a transducer in operating position according to the modified form of the invention;

Fig. 12 is a sealing gasket for use in the modified form of the invention; and

Fig. 13 is a perspective view of the core lamination retaining clip of Fig. 5.

With a more detailed reference to the drawings, and particularly to Fig. 1, there is shown the cleaning section of a grinding and polishing line. Ordinarily a glass sheet after being polished on one side is turned over bedded in plaster and sent back through the polishing apparatus in order to polish the other side. On emerging from the polishing apparatus after this second polishing operation, the undersurface of the glass sheet must be cleaned to remove any plaster or other foreign material which may have been picked up during the polishing of the opposite side. Heretofore, in order to clean this underside of the glass sheet by sonic means it was customary to turn the underside upward before cleaning. It is obvious that cleaning the underside of a glass sheet in this manner is not only difficult from a handling standpoint, but is also time consuming and therefore objectionable for a production line in which large numbers of glass sheets are to be processed in a relatively short time.

Briefly to remove foreign material from the underside of sheet material according to the invention there are provided a plurality of vibration generating elements, magnetostrictive transducers for example, mounted in a unique fashion beneath the sheet material to be cleaned. Between the sheet material and the working faces of the vibration generating elements there must of course be provided a suitable vibration transmitting material in contact with both the working faces of the transducer and the sheet surface. The purpose of this energy transmitting material is to provide a medium in which the generated sonic vibrations may produce cavitation with the resultant agitation of the medium that loosens any foreign material that may be adhering to the surface being treated and thus permit these foreign particles to be easily removed. By mounting the transducers below the surface it is possible to clean the surface by sonic methods as the glass is passing through a bath of the energy transmitting material.

An additional advantage is to be gained by mounting the sonic generating elements beneath the glass sheet to be cleaned in that a constant distance between the surface to be cleaned and the generating elements is maintained. In apparatus where the transducers are mounted above the sheet an increase in the thickness of the sheet beyond a certain amount causes the sheet to strike the vibrating faces of the transducers. Obviously with the sheet material being carried above the generating elements in accordance with the invention any variation in the thickness of the sheet material will not produce this difficulty.

Referring now to Figs. 1, 2 and 3 in greater detail there is shown a portion of a cleaning section in which the lower surface of glass sheets are cleaned according to a preferred embodiment of the invention. This cleaning section includes a series of horizontally disposed rolls 20 suitably journaled in support members 21 so that the upper peripheral surfaces of these rolls will provide a continuous planar conveying means for carrying a glass sheet 22 along a predetermined path. Spaced along the path of movement of the glass sheet 22 and adjustably secured to the support means 21 are guide rollers 23 which are disposed with their peripheral surfaces facing inwardly towards the glass sheet in order to receive the edges of the sheet and provide a guiding means for maintaining the sheet in a proper lateral position on the drive rolls. These rollers may be adjusted inwardly or outwardly in relation to the edge of the glass sheet for positioning the sheet accordingly, by loosening bolt 24, moving the roller arm 25 in the desired direction and then resecuring the bolt.

In a preferred embodiment the vibration generating elements or transducers 26 are mounted individually in two lines substantially transverse to the path of movement of the sheet material and as is shown generally at 27 in Fig. 1. The working faces 28 of the transducers in each of the lines may be disposed so as to have their greatest width $a$ at right angles to the path of movement of the sheet material, which arrangement provides a greater cleaning width of the line of elements. Also the two lines of transducers are staggered so that the transducers of one line will clean or treat the strips of the sheet material which have been left untreated by the spaces between the transducers of the other line. The rolls 20 and the upper portions 29 of the transducers are situated in a tank 30 filled with an energy transmitting medium 31 which for our purposes is preferably a liquid such as water. As can be seen best in Fig. 2 the lines 27 of transducers are mounted on raised portions 32 of the bottom of the tub 30 and in such a manner that each of these transducers presents its working face 28 parallel to the underside of the sheet 22 being conveyed thereover by rolls 20.

The spacing between the working face of the transducers and the surface of the glass to be cleaned has been found to produce the best results when it is in the order of .060 . . . .100 of an inch. This spacing may be varied by loosening bolts 33 and positioning journal bracket 34 as necessary. Raising or lowering this bracket produces a corresponding change of position of rolls 20 and the glass sheet 22 carried thereon.

It is advisable in mounting these transducers in operative position to insure that the transducers are maintained securely. This is important since not only would a loose mounting of the transducer result in reduced efficiency of operation and an undesirable increase in operation noise because of vibration between the tub and transducer, but also since the working faces and upper portions 29 of the transducers are submerged in water any looseness in mounting would permit water to seep down to the electrical portions of the transducer outside the cleaning tub and increase the possibility of damaging it through short circuits.

Therefore, in mounting a transducer 26 of the type shown in Fig. 5 there is provided in the tank for each transducer an opening 35 of sufficient size to enable it to receive the lower portion 36 of a transducer. There are also provided support blocks 37 containing an opening of the same diameter as opening 35. These blocks are affixed to the tub 30 so that the opening 35 in the tank and the one in the block 37 are aligned. The transducer 26 is provided with an enlarged mounting plate 38 near its mid-point the diameter of which is slightly larger than the opening 35. Therefore, when the transducer is lowered into position through the opening 35 the mounting plate 38 rests on a gasket 39. The mounting plate 38 is held in a tight sealing relationship by means of a pair of retaining clips 40 which engage the upper marginal edge of mounting plate 38. These clips 40 are provided with centrally located bolts 41 which when threaded into support blocks 37 force the mounting plate 38 down onto the gasket thus producing a tight waterproof seal. There is also provided locator keys 42 secured on block 37 by screws 43 which are adapted to engage notches 44 formed in the peripheral edge of the mounting plate 38. The notches 44 are diametrically located in the plate and more particularly are axially aligned with the greatest width $a$ of the transducer working face 28 to assure that the transducers will be properly positioned in relation to one another.

As seen best in Fig. 5, the transducers which generate the sonic energy used in the cleaning process comprise a U-shaped core 45 which is a stack of thin laminated leaves or strips of ferromagnetic material; a coil 46 arranged in surrounding relationship to the legs of the core and which when connected to a power source of alternating current sets up an alternating magnetic field within the core; a magnet 47 positioned between the legs of the core for providing a polarizing effect on the core; an acoustical horn 48 firmly secured to the cross leg of the core for directing the vibratory energy produced by the magnetostrictive movement of the core to a region where this energy may be utilized.

Briefly, the principle of operation of a magnetostrictive transducer is that when an alternating current flows in the core a corresponding alternating field is induced in the core which because of its inherent ferro-magnetic properties produces a cyclic change in length of the core of the same frequency as that of the voltage which is used to energize. Since the acoustical horn which is firmly fixed to one end of the core moves correspondingly with each cyclic change in length of the core, the free end of the horn or working face 28 serves as a useful source of vibratory energy. The frequency of the voltage used, for the purpose described herein is in the order of 10 kilocycles, although a number of satisfactory values may be found depending on the type of operation being performed, the amount of power used, and the particular design of transducer being used.

As shown in Fig. 5, the transducer has a protective cover 49 which encloses the lower portion 36 of the transducer including the core 45, coil 46, and magnet 47. This protective cover has projections 50 and 51 which are so disposed that when the cover is in position, the projections will hold or maintain the coil 46 and polarizing magnet 47, respectively in a fixed position. The projections 50 for holding the coil in place on the leg portions of the core 45 are shown as four triangular portions in Figs. 6 and 7, and the central projection 51 that holds the magnet in place is shown in Fig. 7.

With reference particularly to Fig. 8, there is disclosed the electrical components and connections thereto of a transducer as according to the preferred embodiment. The connection to the external supply of electrical power (not shown) is provided by jack plugs 52 disposed in the lower portion 53 of the cover 49. The use of jack plugs for making the electrical connections permits rapid and foolproof changing of transducers in case they fail or need repairs. Also shown is a condenser 54 provided for power factor correction.

In an alternate embodiment of the invention a plurality of transducers are arranged as is shown in Fig. 9 into a cleaning unit or module 55. These transducers are arranged in a spaced linear relationship, thus presenting a row of vibrating surfaces to a surface to be cleaned.

The transducers in this alternate embodiment are held in a fixed relationship with respect to a pair of module mounting irons 56 by means of a pair of unique securing bars 57. This securing bar 57 comprises an upper flange portion 58 which is so shaped as to fit over the flanges of the transducers as in Fig. 11, and a serrated spacing portion 59 which when placed in position along the long side of a line of transducers in a module 55, the serrations 60 dovetail with the spaces between flanges of adjacent transducers. The effect achieved when the pair of securing bars 57 are in place is to provide a module in which individual transducers are secured in an immovable fixed relationship with each other and in which this relationship will not be changed by operational vibration in normal use.

As is shown in Fig. 11 there is provided a protective cover 61 which completely encloses the cores and coils of the transducers in a cleaning module 55. This cover is secured to mounting irons 56 by means of screws 62 threaded therein. Also provided on the inner sides of the cover 61 are longitudinally extending brackets 63 for holding the coils 46 on the legs of the cores 45 and another longitudinally extending bracket 64 for holding the magnets 47 in place between the core legs.

As in the preferred embodiment, electrical connections are made by means of jack plugs 65 in the lower side of the covers 49. By properly connecting the coils of the individual transducers only one set of jack plugs is needed for each module.

The mounting of a module in operative position is best illustrated in Fig. 11. The wall 66 of the tub is provided with an opening just large enough to receive the cover 61 of the module. The edges 67 of the opening are recessed in order to receive a gasket on which the overlapping edges of the securing bars 57 rest. The module 55 is then held against the tub wall 66 by means of retaining plates 68 overlapping the bars 57 and secured by means of bolts 69 threaded into the wall.

In order to properly seal or make water tight a module 55 it is desirable to provide an additional specially shaped gasket 70 which is placed between the individual transducers. Such a gasket 70 is shown in Fig. 12. This gasket is so shaped as to be able to fit in the space 71 between the individual transducers (Fig. 9). The corner notches 72 are provided for fitting underneath the upper flange 58 of the securing bars 57 in order that these bars may hold the gaskets in place. The gaskets are of suitable thickness so that in a completed module 55 the spaces 71 between the individual transducers are filled and provide water-tight seal.

In Fig. 13 there is illustrated a unique core lamination retaining clip 73 which is snapped in place over the outer edges of the legs of the cores 45 as shown in Figs. 5 and 11. These clips are made of a material such as spring steel for holding the laminations of the core in a close contacting or pinching relationship. The use of the clips eliminates any gapping between the laminations and thereby promotes a more efficient operation.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:

1. Apparatus for cleaning the underside of substantially horizontally disposed sheet glass, comprising a tank having a bottom wall and side walls and adapted to contain a supply of a liquid vibratory energy transmitting medium, said bottom wall having raised portions spaced from one another, a conveyor for carrying the sheet glass along a definite path with at least the underside of said sheet glass being in contact with said liquid medium, and vibration generating means located in the raised portions of said bottom wall and including vibrating faces disposed within said liquid medium and positioned to direct vibratory energy onto the underside of said sheet glass as it moves along said path.

2. Apparatus for cleaning the underside of horizontally disposed sheet glass, comprising a tank having a bottom wall and side walls and adapted to contain a supply of a liquid vibration transmitting medium, said bottom wall having raised portions spaced from one another and extending transversely of said tank to provide mounting surfaces, a conveyor for carrying said sheet glass along a definite path through said liquid medium, a plurality of vibration generating transducers located in openings in said raised mounting surfaces and disposed in rows arranged transversely of the path of travel of the sheet glass through said tank, means for removably securing said transducers to said raised mounting surfaces in sealing relation thereto, and positioning means for maintaining the transducers in each row in fixed relationship to one another.

3. Apparatus for cleaning the underside of substantially horizontally disposed sheet glass as claimed in claim 2, wherein said transducer securing means comprises retaining clips engaging a portion of the transducer and holding it in contact with said raised mounting surfaces, and said positioning means comprises locator keys carried by said raised mounting surface and received in notches in said transducers for positioning the same relative to one another.

4. Apparatus for cleaning the underside of horizontally disposed sheet glass, comprising a tank having a bottom wall and side walls and adapted to contain a supply of a liquid vibration transmitting medium, a conveyor for carrying said sheet glass along a definite path through said liquid medium, a plurality of vibration generating transducers arranged side by side transversely of the path of travel of the sheet glass, said transducers being provided with enlarged mounting plates, and means for securing said transducers in position comprising a serrated bar including an upper portion engaging said mounting plates and a lower portion having serrations fitting between adjacent transducers and maintaining them in fixed spaced relation.

5. Apparatus for cleaning the bottom surface of horizontally disposed flat sheet material by sonic vibrations, comprising a tank having a bottom wall and side walls and adapted to contain a supply of a liquid vibratory energy transmitting medium, conveyor means for supporting the sheet material and conveying it in a horizontal path through the tank, a plurality of vibration generating transducers, each including a working face, and means for mounting said transducers in the bottom wall of the tank with the working faces thereof positioned parallel with and in close proximity to the bottom surface of the flat sheet material to provide a thin film of the liquid vibratory energy transmitting medium between the working faces of the transducers and the bottom surface of the sheet material such that upon operation of the vibration generating transducers the bottom surface of the sheet material will be cleaned by cavitation.

6. Apparatus as claimed in claim 5, in which the working faces of the transducers are spaced from the bottom surface of the sheet material in the order of .060 to .100 of an inch.

7. Apparatus as claimed in claim 5, in which the conveyor means comprises a plurality of spaced rolls, and in which the transducers are located between two adjacent rolls, with the working faces thereof spaced from the bottom surface of the sheet material in the order of .060 to .100 of an inch.

8. Apparatus as claimed in claim 5, in which the conveyor means comprises a plurality of spaced rolls, and in which two rows of transducers are located between adjacent rolls and spaced from one another along the path of travel of the sheet material, with the working faces of the transducers in one row being staggered with relation to the working faces of the transducers in the other row.

9. Apparatus as claimed in claim 5, in which the conveyor means comprises a plurality of spaced rolls, and in which the transducers are located between two adjacent rolls.

References Cited in the file of this patent

UNITED STATES PATENTS

| | | |
|---|---|---|
| 924,683 | Marshall | June 15, 1909 |
| 2,296,028 | Gribble | Sept. 15, 1942 |
| 2,360,978 | Putter | Oct. 24, 1944 |
| 2,445,318 | Eldredge | July 20, 1948 |
| 2,468,550 | Fruth | Apr. 26, 1949 |
| 2,522,071 | Tait | Sept. 12, 1950 |
| 2,550,771 | Camp | May 1, 1951 |
| 2,784,119 | McCown | Mar. 5, 1957 |